United States Patent [19]
Stenfeldt

[11] 3,765,291
[45] Oct. 16, 1973

[54] TOOL GRIPPING AND GUIDING DEVICE FOR TOOL EXCHANGER FOR PUNCHING AND NIBBLING MACHINES

[76] Inventor: Jan-Olof Stenfeldt, Meteorgatan 6, 5 Van, Gothenburg, Sweden

[22] Filed: July 23, 1971

[21] Appl. No.: 165,086

[30] Foreign Application Priority Data
Aug. 20, 1970 Sweden.............................. 11352/70

[52] U.S. Cl................... 83/563, 29/568, 214/1 BV, 83/701
[51] Int. Cl.............................................. B26d 5/08
[58] Field of Search ............... 29/568; 83/563, 564, 83/701; 214/1 BC, 1 BD, 1 BH, 1 BV

[56] References Cited
UNITED STATES PATENTS
| | | | |
|---|---|---|---|
| 3,431,635 | 3/1969 | Balding | 29/568 |
| 3,348,298 | 10/1967 | Sedgwick | 29/568 |
| 3,590,470 | 5/1969 | Brainhard | 29/568 |
| 3,277,568 | 10/1966 | Wetzel | 29/568 |

Primary Examiner—Andrew R. Juhasz
Assistant Examiner—W. D. Bray
Attorney—Robert E. Burns et al.

[57] ABSTRACT

An apparatus for transferring a tool from a non-working position to a working position in punching machines or the like, wherein the means for transferring the tool comprises a fluid actuated member with tool gripping means disposed on the end thereof.

6 Claims, 6 Drawing Figures

TOOL GRIPPING AND GUIDING DEVICE FOR TOOL EXCHANGER FOR PUNCHING AND NIBBLING MACHINES

The present invention is relating to machines for punching, nibbling and similar operations, wherein sheet material is worked between two tools movable relative to each other, said tools being positioned one above the other and comprising an upper movable tool and a lower fixed tool. It is important that the tools are accurately aligned for correct position of cooperating working surfaces, for example when said surfaces define a cutting clearance there between. In conventional machines of this kind the mounting of the tools is commonly carried out in the form of a manual operation and the alignment of the tools can be made without difficulty by means of conventional methods in connection with the mounting.

In combined operations when using different tools it is desirable to provide said machines with means for automatic tool exchange, whereby a quick exchange of tools according to a predetermined program is obtained. The U.S. Pat. specification No. 2,701,017 gives an example of a machine having such equipment. Said specification discloses a revolving punching machine having a C-shaped frame and carrying its tools at the extremities of the arms of the frame. The tools comprise a lower fixed die and a punch movable in a vertical direction against said die. Within the throat of the frame are received two revolving discs or tool revolvers positioned one above the other and aligned on a common axis, said revolving units carrying cooperating pairs of tools along the periphery thereof. By means of an indexing mechanism and by rotation of the revolvers the respective pairs of tools can be brought into operational position in the machine. In operational position the lower tool is secured in fixed position on its revolver, whereas the upper tool is axially movable in its revolver against the lower tool. A mechanism engages the upper tool for performing the desired operation in the machine. The tools are locked in operational position by locking pistons engaging the periphery of the tool revolvers. The relative position of the tools is therefore entirely depending on the accuracy of the locking mechanism. The number of tools at disposition is further limited to the very number of tools which can be received in the tool magazine comprising an upper and a lower tool revolver only.

A development of this device in order to enable the reception of an increased number of tools comprises a turret type magazine separately mounted beside the machine, in which the respective cooperating pairs of tools are supported in positions relative to each other corresponding to their operational position on a plurality of turret discs arranged in pairs on top of each other, whereby two parallel and simultaneously operating tool exchange units are arranged for transport of the respective tools from the magazine to the operating position of the tool and for return transport in reversed direction. In this apparatus the respective tool is seized by gripping means mounted on the tool exchange unit, said gripping means being arranged for guiding the tools in their operational positions and in their turn being guided relative to the machine frame by means of locking pistons engaging the gripping means adjacent the operational position of the tool. Also in this case the position of the tool is depending on the accuracy of the locking mechanism and the guiding stability of the gripping means.

The invention has for its object to provide a gripping and a guiding device for punching machines, nibbling machines and similar machines having a tool exchanger cooperating with a tool magazine of large capacity for obtaining an accurate relative adjustment of the tools, and is characterized therein that each respective tool is fixedly secured or guided in operational position by means of a guiding element fixedly secured on the machine and a cooperating combined gripping and guiding element supported on the tool exchange unit, said elements receiving the tool there between in operational position.

In this device two cooperating tools are simultaneously transferred from the magazine to their operational positions, whereby one tool may be locked in a fixed position and the other tool may be guided for axial motion against said first mentioned tool, as desired.

The tool exchange units are further arranged for cooperation with a tool magazine mounted beside the machine and comprising a plurality of turret discs arranged in pairs on top of each other, thus enabling a great number of tools to be received in the magazine.

A preferred embodiment of the invention is descirbed hereinbelow and with reference to the accompanying drawings FIG. 1 is a plan view of the device according to the invention mounted on a punching machine or a similar machine, portions of the outline of the machine and a turret type magazine mounted beside the machine being indicated with dash-dotted lines.

Figure 1:
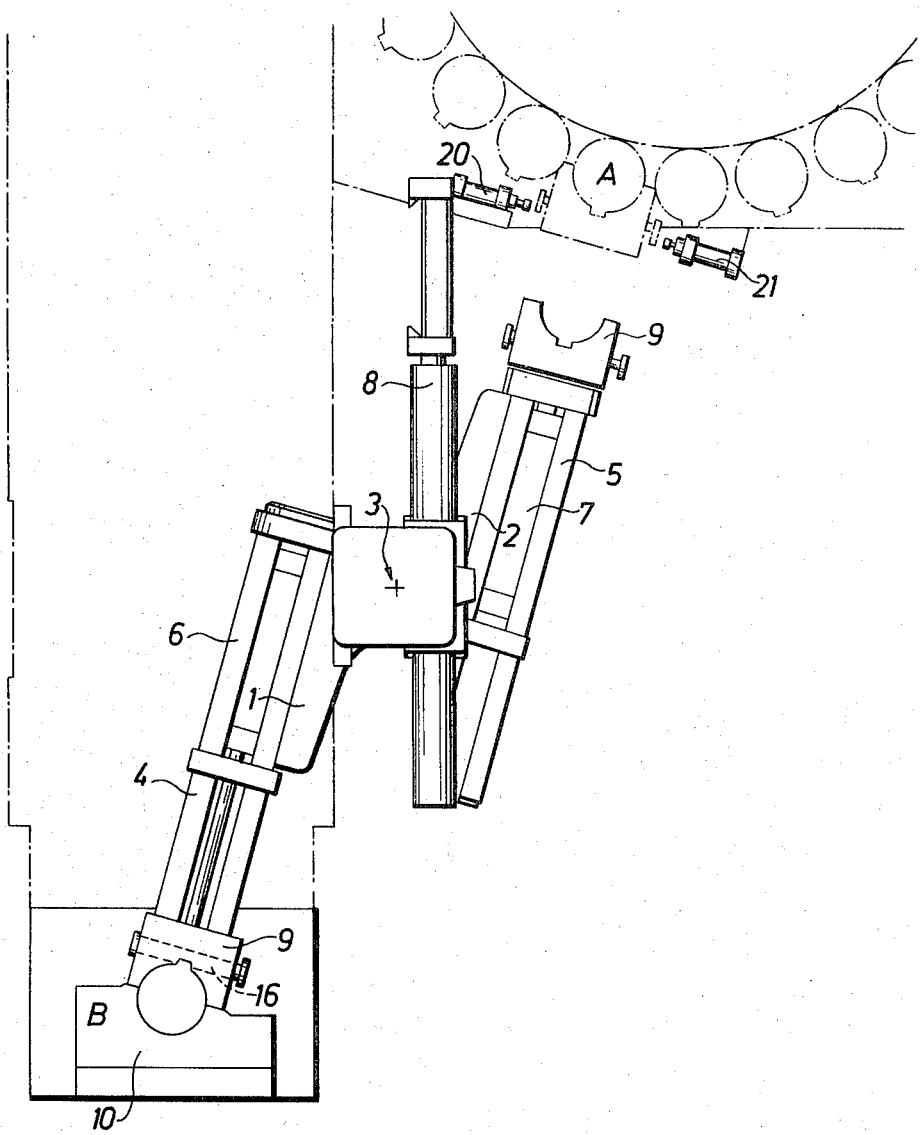

Referring to FIG. 1 the device according to the invention comprises a unit mounted beside the machine frame for horizontal rotation about a fulcrum 3 and including two slide systems 1 and 2 for movement in opposite directions. The unit is rotated about the axis of fulcrum 3 by means of a driving unit 8, preferably in the form of a pressure fluid operated cylinder jack coupled to a rack and gear mechanism. Each slide system has a slide unit 4 and 5 respectively, for substantially radial motion away from fulcrum 3 as driven by one of cylinder jacks 6 or 7.

Each slide unit 4, 5 is in its outer end supporting a combined gripping and guiding element 9, arranged for seizing a tool in a starting position A in the tool magazine and for transferring said tool to an operational position B in the machine. As generally indicated in FIG. 1, the tools are supported in the magazine along the periphery of the respective turret discs. A plurality of such turret discs may be positioned on top of each other for vertical displacement to a position facing gripping element 9, as further explained below. When the tool has been seized it is transferred to operational position B in the machine for fixedly securing or guiding, respectively, during the machine operation.

In the embodiment as shown the device is constructed for similtaneous transfer of an upper and lower tool between starting position A and operational position B, in both directions. In this case two tool exchange units 1 and 2 are positioned one above the other on the upper and lower side of the horizontal throat of the machine frame, respectively. Both units are identical except for the gripping and guiding elements 9 which are designed for receiving the upper and lower tools, respectively. In the embodiment as shown the lower tool is arranged for a fixed operational position, whereas the upper tool is arranged for axial motion when engaged by the driving mechanism of the machine in its operational position. In starting position A the respective pairs of tools including an upper and lower tool are supported at the periphery of turret disc pairs in the magazine, in a position corresponding to the operational position of the tools.

Figure 2:
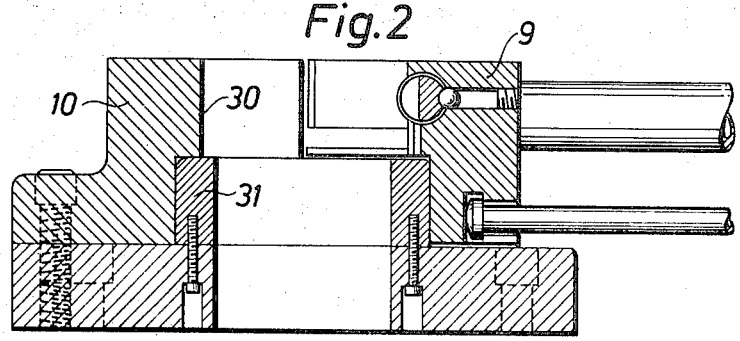
FIG. 2 is a vertical cross section through line II—II in FIG. 3 showing the guiding and gripping element for the lower tool in operational position.
Figure 3:
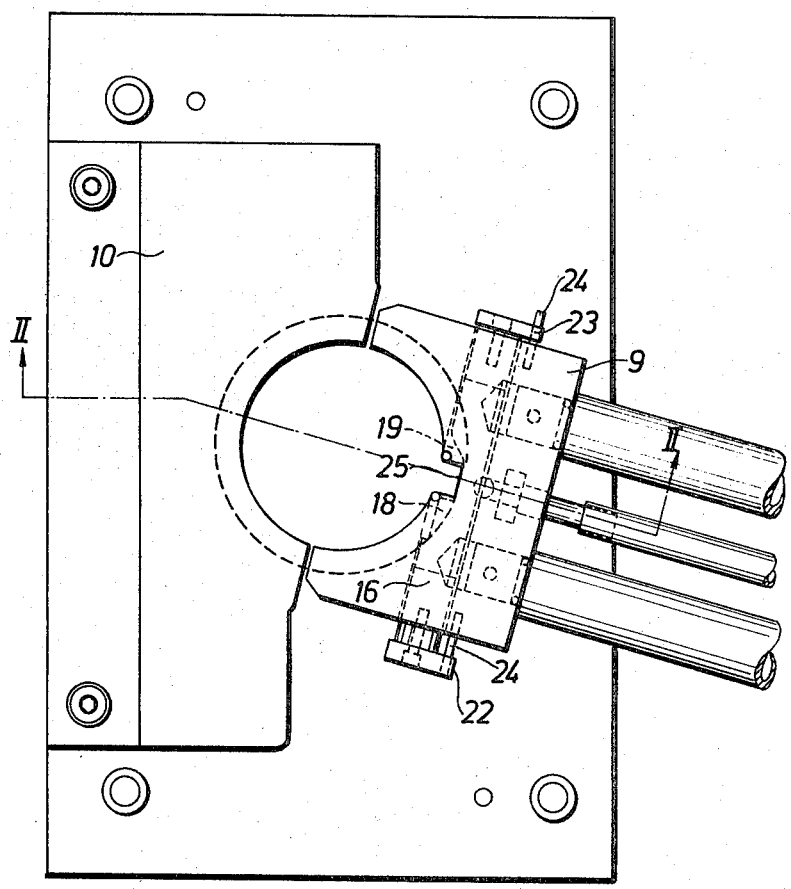
FIG. 3 is a corresponding plan view of said units.

FIG. 2 shows the combined gripping and guiding elements for the lower fixed, or stationary, tool. These elements include the above mentioned element 9 supported at the end of slide unit 4 or 5 and a cooperating guiding element 10 secured on the machine frame. These two elements form together — in the embodiment shown — a circular cylindrical internal supporting surface 30 for engaging the correspondingly shaped external periphery of the lower tool. The tool is resting on an annular supporting ring 31 secured to the machine frame. Element 9 has a lower half-cylindrical recess therein corresponding to the external periphery of ring 31 and is guided in operational position by said ring. The cylindrical surface 30 of element 9 has a groove 25 therein for receiving a correspondingly shaped key extending from the lower tool. Perpendicularly to the extension of said groove the element 9 has a boring receiving an axially displaceable slide 16. Said slide has a longitudinally extended portion 18 of swallow-tail cross section and diverging towards the tool and so positioned that said portion 18 extends into the groove 25 when slide 16 is displaced in axial direction. The key extending from the tool (not shown) is received in groove 25 and has a recess of swallow-tail section corresponding to the cross section of portion 18 for receiving said portion. Portion 18 extends longitudinally of slide 16 over a distance adjacent the middle part thereof and is axially defined by a recess 19 traversing the key 16 and having a cross section of such dimension that the recess extends beyond groove 25 when recess 19 is aligned with groove 25. The slide 16 can be axially displaced in its boring through element 9 for engaging portion 18 with the corresponding recess in the key extending from the tool into groove 25, or for positioning recess 19 in front of said tool key. The axial displacement of slide 16 is limited by means of end stops 22 and 23. Guiding pins 24 are axially slidable in corresponding borings in element 9 for keeping the slide from rotation about its axis. A locking device comprising a spring biassed ball engaging a recess in slide 16 prevents unintentional axial displacement of slide 16 in its respective end positions.

It is understood that the gripping and guiding element 9 by axial displacement of slide 16 can be set in a first position wherein a tool with its guiding key can be attached to element 9, and in a second position wherein the tool is locked to element 9 by the portion 18 of slide 16 engaging the swallow-tail recess in said key. For seizing a tool in the magazine the element 9 is moved against the tool, the extending guiding key of which is accurately set in alignment with groove 25, slide 16 being set in its first position. When element 9 is engaging the tool, slide 16 is displaced to its second position and the tool is locked to element 9. In this condition the tool is transferred to its operational position and is automatically aligned therein through cooperating surfaces of ring 31 and element 9. In said position the tool is supported around its periphery by engagement against the cylindrical supporting surface 30 and is axially locked through slide 16. In this way the tool is held in an accurately fixed position in its stationary operational position.

Figure 4:
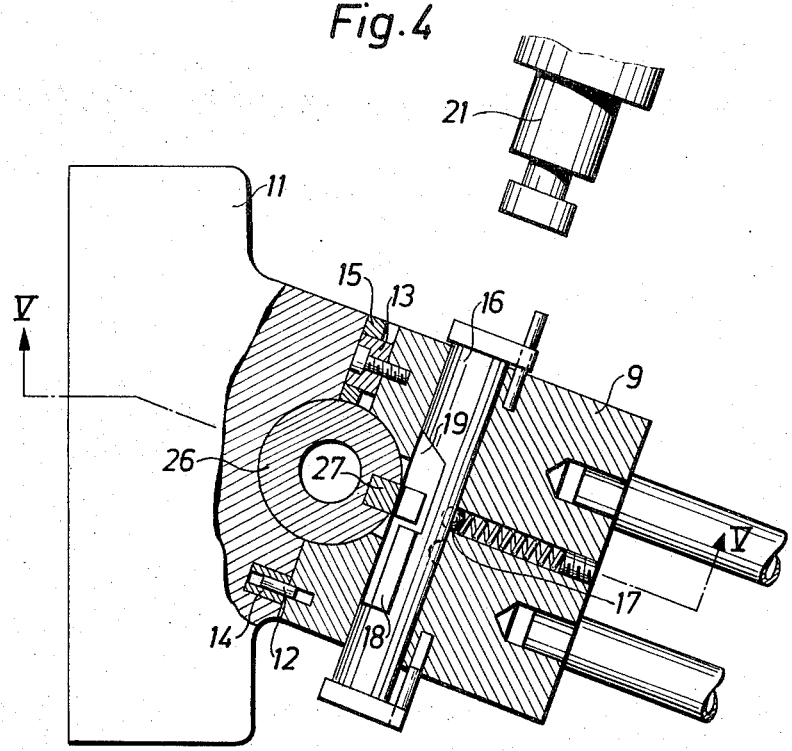
FIG. 4 is a partial section through line IV—IV in FIG. 5 showing the gripping and guiding element for the upper tool in operational position with a tool inserted there between and with locking and releasing elements for the tool indicated.
Figure 5:
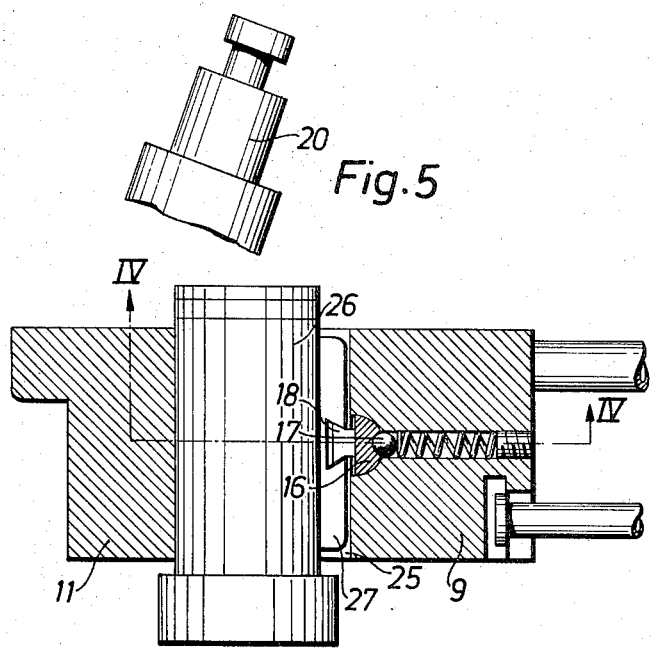
FIG. 5 is a vertical section through line V-V in FIG. 4.

Similar gripping and guiding elements for the upper tool are shown on FIG. 4 and 5, illustrating a tool 26 guided in its operational position. In this case the tool is guided for axial motion through guiding elements 9, 11. Element 11 is stationary and is, together with guiding and gripping element 9 of the upper tool exchange unit, forming a circular cylindrical guiding surface for the cylindrical peripheral surface of the tool. The tool has a guiding key 27 extending into the axial groove 25, and can be locked to element 9 or released therefrom by axial displacement of slide 16, as described above. The operation of the upper tool exchange unit generally corresponds to the operation of the lower unit. The tool is seized in its starting position A and transferred to operational position by means of element 9. Element 9 is aligned with stationary element 11 by means of guiding pin 12 and guiding key 13 which engage stationary hardened inserts 14 and 15, respectively, in element 11. As the tool 26 in this case has to perform an axial motion in its operational position, the slide 16 is reset for bringing its recess 19 in front of guiding key 27 of the tool, thus enabling the tool to move in axial direction. By cooperation of the fixed element 11 and element 9 an accurate radial guiding of the tool 26 during its axial motion is obtained.

Stationary operating units 20, 21 are mounted on each side of element 9 in its starting position A and in its operational position B for setting slide 16 in a first locking position and a second release position, respectively. Said units preferably comprise pressure fluid operated cylinder jacks.

Figure 6:
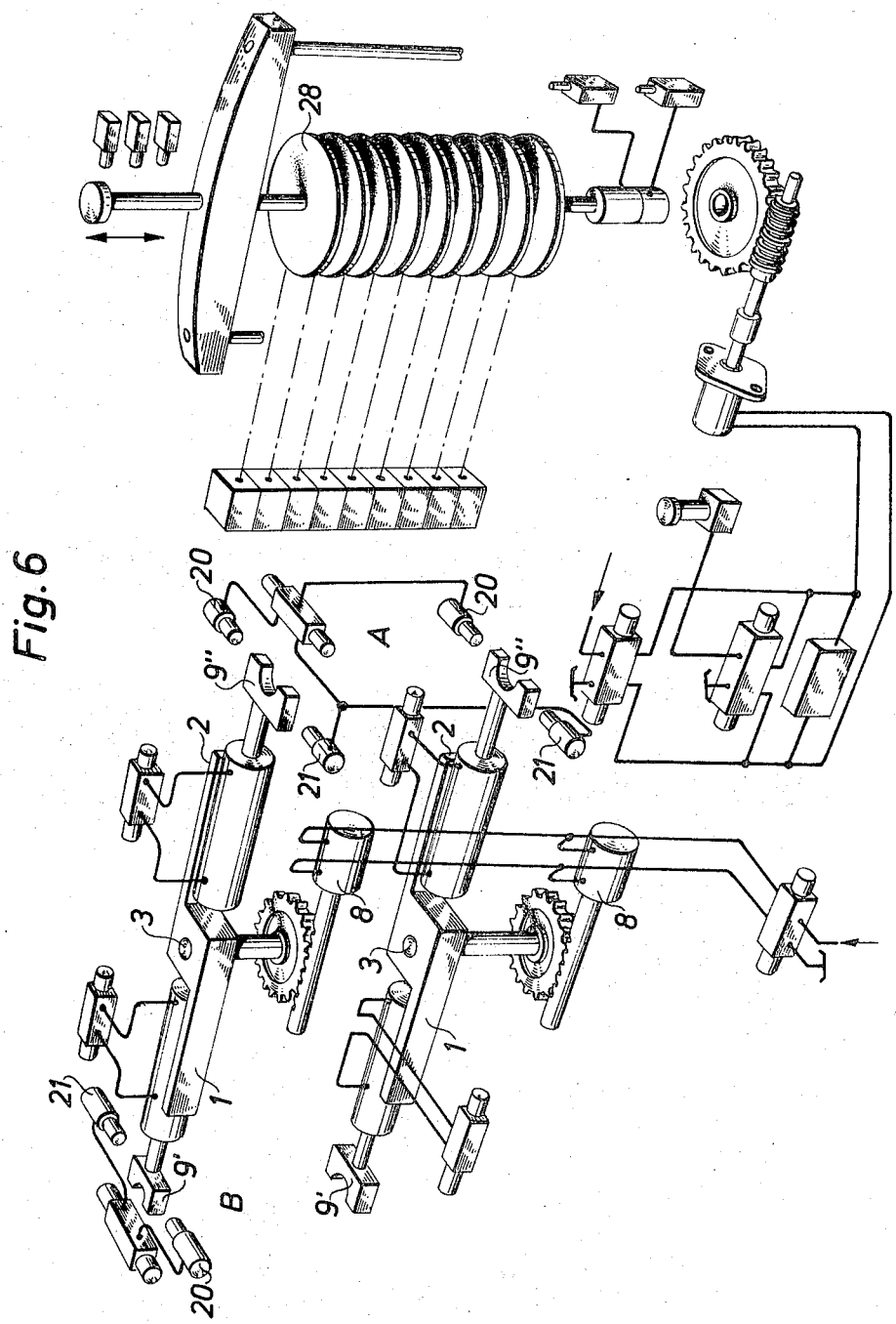
FIG. 6 is a diagrammatic exploded view of the tool exchanger with attached tool magazine.

The operation of the device is described below with reference to the above mentioned figures and to FIG. 6. The movable gripping and guiding elements of each unit are denominated 9' and 9'' respectively, in order to better clarify the representation of the invention in FIG. 6.

1. Fetching operation.

Tool magazine 28 contains pairs of pre-adjusted tools for carrying out desired work operations. The tools are mounted in the magazine with their guiding keys extending towards the respective grooves 25 in elements 9, in alignment therewith. For receiving a pair of tools according to a predetermined program the magazine — comprising a number of superimposed pairs of turret discs — is rotated and vertically displaced for positioning the desired tools in starting position A. Slides 5 of slide systems 2 are extended to approach the tool magazine for bringing the supporting surfaces of gripping and guiding elements 9'' into engagement with corresponding surfaces of the tools. The guiding keys 27 are introduced into grooves 25 in elements 9″. The slides 16 are set in their free position with recess 19 in front of groove 25. Pressure fluid is supplied to operating units 20 positioned adjacent the upper and the lower tool in the magazine for displacing slides 16 in order to engage swallow-tail section portions 18 with corresponding recesses in the tool keys. Slides 5 are returned to their starting position by cylinder jacks 7, thereby taking the tools out of the magazine.

At the same time or earlier the opposite slides 4 are returned to corresponding retracted position.

2. Exchange operation.

The upper and the lower tool exchange units are simultaneously rotated 180° about the axis of fulcrum 3 by means of cylinder jacks 8. Slides 5 together with gripping and guiding elements 9″ and the tools received therein are extended by means of cylinder jacks 7 towards operating position B. Elements 9″ are guided into and attached to the respective stationary guiding elements 10, 11. The upper tool is connected with the mechanism of the machine and slide 16 is reset in free position by operating unit 21. Being radially guided, the upper tool can thereafter perform its reciprocating motion. The lower tool is fixedly secured radially and axially by elements 9″ and 10.

3. Work operation.

When the machine is performing the desired work operation using the tools thus mounted in the machine, the magazine is moving the tools for the next work operation into their starting position A. The fetching operation is thereafter repeated by means of gripping and guiding elements 9′ of slide system 1. The tool magazine is thereafter returned to the said starting position for the very tools being in use.

4. Returning operation.

After finishing the above work operation the slide 16 is reset in its locking position by means of operating unit 20 adjacent operating position B and the tool is locked to element 9″. The lower tool still being locked to its gripping and guiding element 9″ and the correspondingly locked upper tool are simultaneously retracted together with slides 5 by means of cylinder jacks 7. The tools to be used in the following work operation are supported in retracted position on their gripping and guiding elements 9′. Both tool exchange units are turned 180° about the axis of fulcrum 3. Elements 9″ return their tools to the pre-set receiving seats in the tool magazine. The tools are released from elements 9″ by means of operating units 21 at the magazine and elements 9″ are returned in retracted position in the tool exchange units. Gripping and guiding elements 9′ will thereafter bring their tools in operational positions, the upper tool being connected with the driving mechanism of the machine and released for axial motion. The lower tool will be maintained in fixed position. When these tools are performing their work, the tool magazine will bring the following pair of tools into starting position.

The above working cycle is repeated until the predetermined program has been completed. Thereafter the tools are again received in their predetermined positions in the tool magazine.

In the foregoing example the invention has been described as including two cooperating tools which are simultaneously performing a parallel working and exchange cycle. This is the normal case for nibbling and punching machines. It is, however, also possible to apply the invention for exchange of one tool only for cooperation with a second stationary tool in the machine. In such case it is sufficient to use one tool exchange unit only.

I claim:

1. In combination with a machine tool having a tool guiding surface for guiding in operation in a movable tool when same is in a working position wherein same may be moved by said machine tool, an apparatus for transferring said tool between a non-working position and said working position comprising: movable gripping means for releasably gripping said tool for moving same between said working position and said non-working position and having means coacting with said tool guiding surface for alternatively holding said tool in said working position and guiding same during movement by said machine tool; and transpecting means for moving said gripping means and to effect transfer of said tool between said non-working position and said working position.

2. Apparatus according to claim 1 wherein said machine tool includes another guiding surface aligned with said first mentioned guiding surface; and including another movable gripping means for releasably gripping a stationary tool for moving same between a non-working position and a working position and coacting with said another guiding surface for holding said stationary tool in said working position when same cooperates with said movable tool for working on a workpiece during operation of the machine tool, and another transporting means for moving said another gripping means and to effect transfer of said tool between said non-working position and said working position.

3. An apparatus according to claim 2 including means on said movable tool defining a guiding key; and wherein said gripping means has means therein defining a guiding keyway coacting in operation with said guiding key to guide said movable tool as same moves and for positioning said movable tool in said gripping means.

4. An apparatus according to claim 3 wherein said gripping means includes locking means for locking said movable tool therein comprising means in said guiding key defining a locking groove, means defining a bore in said gripping means, a slide member slidable in said bore between a locked position and an unlocked position and having an engaging portion engageable with said locking groove for locking said movable tool in said gripping means when said slide member is in said locked position, and slide moving means for selectively moving said slide member between said locked position and said unlocked position when said gripping means is in said working position or said non-working position.

5. An apparatus according to claim 2 including means on said stationary tool defining a key; and wherein said another gripping means has means therein defining a keyway engageable with said key for positioning said stationary tool in said another gripping means.

6. An apparatus according to claim 5 wherein said another gripping means includes locking means for locking said stationary tool therein comprising means in said key defining a locking groove, means defining a bore in said another gripping means, a slide member slidable in said bore between a locked position and an unlocked position and having an engaging portion engageable with said locking groove for locking said stationary tool in said another gripping means when said slide member is in said locked position, and slide moving means for selectively moving said slide member between said locked position and said unlocked position when said gripping means and said stationary tool are in said non-working position.

* * * * *